United States Patent [19]

Schneider et al.

[11] 3,887,531

[45] June 3, 1975

[54] INTERPOLYMERS OF 5,8-DIMETHYL-1,4,9-DECATRIENE AND/OR 4,8-DIMETHYL-1,4,9-DECATRIENE WITH AT LEAST ONE ALPHAOLEFIN CONTAINING 2 TO 6 CARBON ATOMS

[75] Inventors: Wolfgang Schneider, Brecksville; Robert J. Minchak, Parma Hts., both of Ohio

[73] Assignee: The B. F. Goodrich Company, Akron, Ohio

[22] Filed: Nov. 1, 1967

[21] Appl. No.: 679,620

Related U.S. Application Data

[63] Continuation-in-part of Ser. No. 491,027, Sept. 28, 1965, abandoned.

[30] Foreign Application Priority Data

Sept. 20, 1966 Canada............................. 970861

[52] U.S. Cl............ 260/80.78; 260/80.6; 260/88.2
[51] Int. Cl. ........................................... C08f 15/14
[58] Field of Search............... 260/88.2, 80.78, 80.6

[56] References Cited
UNITED STATES PATENTS 3,285,889  11/1966  Arnold.............................. 260/80.5

3,285,889  11/1966  Arnold.............................. 260/80.78

FOREIGN PATENTS OR APPLICATIONS

| 697,691 | 11/1965 | Italy |
| 795,264 | 12/1967 | Italy |
| 1,121,844 | 7/1968 | United Kingdom |
| 1,816,242 | 7/1969 | Germany |

OTHER PUBLICATIONS

C. S. Marvel and J. R. Rogers, J. Polymer Science, 1961, 49, pages 335–352.

*Primary Examiner*—Joseph L. Schofer
*Assistant Examiner*—A. L. Clingman
*Attorney, Agent, or Firm*—J. Hughes Powell, Jr.

[57] ABSTRACT

Amorphous, unsaturated, sulfur-vulcanizable olefin elastomers are prepared by polymerizing 5,8- or 4,8-dimethyl-1,4,9-decatrienes with at least one alpha olefin containing 2 to 6 carbon atoms with reduced transition heavy metal catalysts such as titanium or vanadium. Such elastomers may contain, for example, less than 80 mol percent ethylene, at least 20 mol percent propylene and less than 20 mol percent dicatriene, and may have an iodine number of about 2 to 35. Other useful interpolymers may contain up to about 35 mol percent butene-1.

6 Claims, No Drawings

3,887,531

INTERPOLYMERS OF 5,8-DIMETHYL-1,4,9-DECATRIENE AND/OR 4,8-DIMETHYL-1,4,9-DECATRIENE WITH AT LEAST ONE ALPHAOLEFIN CONTAINING 2 TO 6 CARBON ATOMS

CROSS REFERENCE TO RELATED APPLICATION

This is a continuation-in-part of our copending application Ser. No. 491,027, filed Sept. 28, 1965, and now abandoned.

BACKGROUND OF THE INVENTION

Unsaturated ethylene-propylene rubbers are currently under development for commerical applications. Certain diolefins have been polymerized with ethylene and propylene for such use, particularly 1,4-hexadiene and dicyclopentadiene. Other interpolymers of ethylene and propylene and polyunsaturated monomers of the norbornene type and diolefins in which only one double bond in terminal such as 6-methyl-1,5-heptadiene have also been prepared and tested. It has generally been considered that the diolefins that could be used for preparing sulfur-vulcanizable unsaturated elastomeric interpolymers of ethylene and propylene should have only one terminal double bond and not be conjugated.

In attempting to prepare sulfur-vulcanizable elastomers from ethylene, propylene and certain trienes as 4,9-dimethyl-1,4,9-decatriene and 5,9-dimethyl-1,4,9-decatriene with reduced metal catalysts, we found that polymerization rates were very slow, floc having very high ethylene content was noted in the polymerization reactors, the polymers were non-homogeneous, the resulting polymers had low molecular weights, the interpolymers would not cure satisfactorily with sulfur although the iodine number of the polymers was sufficiently high, and the physical properties of the vulcanizates so prepared were unsatisfactory.

SUMMARY OF THE INVENTION

We have discovered, quite unexpectedly, that 5,8-dimethyl-1,4,9-decatriene and 4,8-dimethyl-1,4,9-decatriene copolymerized readily with ethylene and propylene, and that compared with the results obtained with the 4,9-dimethyl-1,4,9-decatriene and 5,9-dimethyl-1,4,9-decatriene, that very good polymerization rates were obtained in the same polymerization systems, high molecular weight polymers were obtained which were essentially homogeneous, amorphous and linear and were readily sulfur-curable to provide vulcanizates having an excellent balance of desirable physical properties. The cure rate of the elastomers were superior to those of other available sulfur-vulcanizable polymers of ethylene and propylene.

DETAILED DESCRIPTION

The elastomers are prepared with monoolefins containing 2 to 6 carbon atoms. It is usually preferred to prepare such rubbers from alpha-olefins containing 2 to 5 carbon atoms. Such olefins above ethylene have the formula $R-CH=CH_2$ wherein R is an alkyl group containing 1 to 3 carbon atoms. Ethylene, propylene, butylene and mixtures thereof are particularly preferred. Such interpolymers contain less than about 80 mol percent ethylene and more preferably less than about 70 mol percent ethylene when high molecular weight amorphous elastomeric polymers are desired. When more than one monoolefin is employed, as propylene in conjunction with ethylene, or butene-1, the interpolymers will contain at least 20 mol percent propylene and usually from about 70 to 50 mol percent ethylene and 30 to 50 mol percent propylene. Interpolymers prepared from ethylene and butene-1, for example, are also useful wherein the butene concentration is about 1 to 35 mol percent.

The aliphatic triene content of the interpolymers will be varied from about 0.1 to 20 mol percent and more usually from about 0.2 to 5 mol percent. Excellent results are obtained with 0.5 to 2 mol percent in the interpolymers. Stated another way, the iodine number, representing olefinic unsaturation in the interpolymer, will vary from about 2 to 35, more preferably about 5 to 25. Either of the two 4(5),8-dimethyl-1,4,9-decatrienes may be used or mixtures are suitably employed in preparing unsaturated elastomers. The interpolymers of this invention will have dilute solution viscosities of from 0.5 to 5 as determined in 0.2% solutions of interpolymer in toluene at 25°C.

The elastomeric interpolymers are prepared by polymerizing the necessary monomers with catalysts which contain at least two essential components. The first component is a compound of a transition heavy metal of groups IVB, VB, and VIB of the Periodic Table, including particularly, titanium, zirconium, and vanadium normally in the form of halides, oxyhalides and alcoholates. Such catalysts include $Ti(OR)_4$ wherein R is alkyl, $TiCl_4$, $VCl_4$, $VAc_3$, $VOCl_3$, vanadyl acetylacetonate and the like. The second component of the catalyst system are metals and compounds of groups IA, IIA, and IIIA of the Periodic Table, preferably lithium, sodium, magnesium, and aluminum, as the free metal, hydrides and organo-metallic compounds thereof. In the organometallic compounds, at least one valence bond should connect the metal with an organic radical. Such materials include lithium alkyls, aluminum trialkyls, aluminum dialkyl monohalides, aluminum monoalkyl dihalides, lithium hydride, aluminum hydride, aluminum alkyl hydrides, mixtures thereof, and the like. Good catalysts are prepared from titanium tetrachloride or vanadyl oxychloride and alkyl aluminum halides, preferably the mono- and di-chlorides. The alkyl groups of the later component will contain from 2 to 8 and preferably from 2 to 4, carbon atoms. Normally the Group III metal compound will be present in molar excess in relation to the titanium or vanadium halide.

The polymerization reactions may be conducted in batch or continuous process and equipment. As is known, the equipment and monomers employed must be essentially free of oxygen, water and other polar compounds when the monomers are polymerized with a metal alkyl reduced titanium or vanadium catalyst. Solvents may be used, if desired, and they are normally treated to remove oxygen and water. Useful solvents include the aromatic hydrocarbons such as benzene, toluene, and the like. Chlorinated hydrocarbons such as perchloroethylene have been found to be useful. Aliphatic hydrocarbons such as heptane and hexane also are satisfactory.

The temperature and pressure for the polymerization reaction may be varied quite widely. Temperatures of polymerization may be varied from any temperature above the freezing point of the polymerization mixture to a temperature just below the boiling point of the reaction mixture. Excellent results have been obtained in the range of about −20°C. to about 10°C. In the same manner, while satisfactory polymerizations have been obtained at atmospheric pressure or at pressures of only a few pounds, the polymerization may be carried out at very high pressures.

It is well known that the ratio of monomers in the liquid phase to provide a polymer with a desired composition are controlled within narrow limits. In batch polymerizations one reaches the desired monomer ratios in the liquid phase normally before adding the catalyst, and this compositional ratio in the liquid phase is maintained, if required, by adding a mixture of monomer having the compositional ratio equal to that in the polymer. For example, in the first polymer composition, after the initial charge, a monomer mixture containing 69.7 mol percent of ethylene, 29.8 mol percent propylene and 0.5 mol percent of the decatriene would be added to the reactor as required. To obtain polymers of the following composition monomer ratios in mol percent are maintained in liquid phase as is set forth below.

| Monomer Composition (In Liquid Phase) - Mol Percent | | | | | | | | | |
|---|---|---|---|---|---|---|---|---|---|
| Ethylene | 9.8 | 9.2 | 10 | 6.4 | 6.9 | 4.9 | 5 | 8 | 4 |
| Propylene | 88.2 | 81.8 | 90 | 83.6 | 91.1 | 93.1 | 94 | 71 | 74 |
| Decatriene | 2.0 | 10.0 | 1 | 10 | 2.0 | 2.0 | 1 | 21 | 22 |
| Polymer Composition - Mol Percent | | | | | | | | | |
| Ethylene | 69.7 | 68 | 30 | 59.0 | 59.8 | 49.75 | 50 | 66.5 | 47.5 |
| Propylene | 29.8 | 29 | 70 | 39.0 | 39.7 | 49.75 | 50 | 28.5 | 47.5 |
| Decatriene | 0.5 | 2 | 0.32 | 2.0 | 0.5 | 0.5 | 0.32 | 5.0 | 5.0 |

EXAMPLE I

A five gallon glass-lined reactor equipped with a stirrer and a jacket for temperature control was purged with nitrogen and 10 liters of dry perchloroethylene was charged to the reactor. A mixture of about equal proportions of 5,8-dimethyl-1,4,9-decatriene and 4,8-dimethyl-1,4,9-decatriene was then added to the perchloroethylene in the reactor in a ratio of 100 millimols/liter of perchloroethylene. A mixture of 30 mol percent ethylene and 70 mol percent propylene was charged to the reactor until the concentration of ethylene in the vapor phase above the perchloroethylene was 30 mol percent at 2 psig. The catalyst components were then charged in a ratio of 3.5 millimols/liter of perchloroethylene of diethyl aluminum chloride and 0.4 millimol/liter of perchloroethylene of $VOCl_3$. Pressure was maintained on the reactor by adding a mixture of about 60 mol percent ethylene and 40 mol percent propylene as required to maintain a concentration of 30 mol percent ethylene in the vapor phase above the liquid phase. Additional decatriene is added if required to maintain a constant ratio with ethylene and propylene. The reaction was conducted at 0°C. and a pressure of 2 psig for 160 minutes. The cement in the reactor was fed into a vessel containing alcohol and 1% of 4,4′-thiobis(6-t-butyl-metacresol) as an antioxidant under nitrogen, and the elastomer isolated with steam and dried. The isolated polymer had an iodine number of 22 and contained 60 mol percent ethylene as determined in Infra-red and 39 mol percent propylene. The polymer had a dilute solution viscosity of 2.20, less than 2% gel and a small rotor Mooney at 10 minutes at 260°F. of 44. This material was compounded in the following recipe.

| Polymer | 100 | parts by weight |
| ISAF black | 80 | " |
| Flexon 766 oil | 55 | " |
| ZnO | 5 | " |
| Stearic Acid | 1 | " |
| Tetramethyl thiuram monosulfide | 1.5 | " |
| Mercaptobenzothiazole | 0.75 | " |
| Sulfur | 1.5 | " |

Samples were cured for 40 minutes at 320°F. and the resulting vulcanizates had a 300% modulus of 1,000 psi, tensile strength at break of 3,000 psi and an elongation of 620%.

When this example was repeated with a mixture of 4,9-dimethyl-1,4,9-decatriene and 5,9-dimethyl-1,4,9-decatriene, polymerization rates of only 15% to 25% of those obtained with the 5,8-dimethyl-1,4,9-decatriene and 4,8-dimethyl-1,4,9-decatriene and subsequently lower yields were obtained, the resulting polymer had a dilute solution viscosity of less than one and the compounded products cured very slowly and had tensile strengths less than 1,000 psi.

EXAMPLE II

A continuous polymerization reaction was conducted by filling a reactor with dry oxygen-free perchloroethylene and the temperature in the reactor reduced to 5°C. Ethylene, propylene and a mixture of 5,8- and 4,8-dimethyl-1,4,9-decatriene were fed into the reactor at a ratio of 180 millimols of ethylene, 3,000 millimols of propylene, and 300 millimols of the dimethyl-1,4,9-decatrienes, all per liter of perchloroethylene. The catalyst was charged in a molar ratio of 0.5 millimol of vanadium oxychloride per liter of solvent and 5 millimols of diisobutyl aluminum chloride per liter of solvent in perchloroethylene. The residence time was 120 minutes. The effluent from the reactor was treated with alcohol to stop the reaction and 1% of the antioxidant of Example I was added. The polymer was recovered by steam coagulation of the reaction mixture after which the polymer was dried. This elastomer had a dilute solution viscosity of 2.32, and an iodine number of 25, contained 63 mol percent ethylene determined by Infra-red, and had a 10 minute rotor Mooney of 260°F. of 39. The polymer was compounded to the recipe set forth in Example I above. The polymer had good processing characteristics and vulcanizates cured for 40 minutes at 320°F. had the following physical properties. A 300% modulus of 1,100 psi, tensile strength at break of 2,900 psi, and an elongation of 570%.

Another continuous run was made following essentially the procedure of this Example. The interpolymer had a dilute solution viscosity of 2.6 and an iodine number of 24.6. When compounded to the recipe of Example I, the polymer handled well in processing and vulcanizates of 20 minutes at 302°F. had a tensile strength at break of 3,300 psi, an elongation of 500%, a 300% modulus of 1,400 psi, and excellent abrasion, flex and hysteresis properties. Tires having this polymer in the tread were prepared and found to be very good in such use.

EXAMPLE III 200 ml. of dry hexane was placed in a reactor with 3 ml. of a mixture of equal proportions of 5,8-dimethyl-1,4,9-decatriene and 4,8-dimethyl-1,4,9-decatriene. The reactor was pressured with propylene to 6 psig and 3 ml. of diethyl aluminum chloride was added. The reactor was then pressured to 10 psig with a mixture of 60 mol percent ethylene and 40 mol percent propylene. 1.5 ml. of $VOCl_3$ in dry benzene was added and the reaction allowed to proceed with agitation for one hour at room temperature. The reaction was stopped with ethanol and the polymer precipitated with ethanol and dried under vacuum. This polymer had a dilute solution viscosity of 2.91, contained 37 mol percent propylene and had an iodine number of 9.9. The polymer was readily processed and when compounded to the recipe of Example I cured rapidly and the resulting vulcanizates had good physical properties. Interpolymers prepared as described with about 5 to 15 mol percent butene-1 have excellent physical properties including tensile strengths as high as 3,000 psi with iodine numbers of 15. Interpolymers of ethylene, butene-1 and the dimethyl-1,4,9-decatriene also have good physical properties as when the butene-1 concentration is about 15 to 25 mol percent.

We claim:

1. An amorphous, sulfur-vulcanizable, elastomeric interpolymer containing at least two alpha-olefins containing 2 to 6 carbon atoms, at least one of which is ethylene, and from about 0.1 to less than 20 mol percent of dimethyl-1,4,9-decatriene selected from the group consisting of 5,8-dimethyl-1,4,9-decatriene and 4,8-dimethyl-1,4,9-decatriene and having a dilute solution viscosity of 0.5 to 5 determined in 0.2% solutions of interpolymer in toluene at 25°C.

2. The interpolymer of claim 1 containing at least two alpha-olefins containing 2 to 4 carbon atoms at least one of which is ethylene, in amount less than about 80 mol percent ethylene and 0.1 to less than 20 mol percent of the dimethyl-1,4,9-decatrienes.

3. The interpolymer of claim 2 wherein the interpolymer contains less than about 70 mol percent ethylene, about 30 to 50 mol percent propylene and about 0.5 to 5 mol percent of the dimethyl-1,4,9-decatriene.

4. The interpolymer of claim 3 containing from about 70 to 60 mol percent ethylene, 30 to 40 mol percent propylene and 0.5 to 2 mol percent 5,8-dimethyl-1,4,9-decatriene.

5. The interpolymer of claim 3 containing from about 70 to 60 mol percent ethylene, 30 to 40 mol percent propylene and 0.5 to 2 mol percent 4,8-dimethyl-1,4,9-decatriene.

6. The amorphous, sulfur-vulcanizable elastomeric interpolymer of claim 1 containing less than 70 percent ethylene, at least 20 mol percent propylene, and at least one of 5,8-dimethyl-1,4,9-decatriene and 4,8-dimethyl-1,4,9-decatriene, said interpolymer having an iodine number of from about 2 to about 35.

* * * * *